United States Patent
Winkler et al.

[11] 3,712,720
[45] Jan. 23, 1973

[54] MOTION PICTURE CAMERA WITH FADING MEANS

[75] Inventors: Alfred Winkler, Munich; Friedrich Winkler, Unterhaching; Karl Neudecker, Munich; Johann Zanner, Jr., Unterhaching, all of Germany

[73] Assignee: AGFA-Gevaert Aktiengesellschaft, Leverkusen, Germany

[22] Filed: Sept. 30, 1970

[21] Appl. No.: 76,950

[30] Foreign Application Priority Data

Oct. 3, 1969 Germany...................P 19 49 891.0

[52] U.S. Cl................................................352/91
[51] Int. Cl...............................................G03b 21/36
[58] Field of Search................................352/91, 217

[56] References Cited

UNITED STATES PATENTS

| | | | |
|---|---|---|---|
| 3,582,198 | 6/1971 | Reinsch | 352/217 X |
| 3,246,944 | 4/1966 | Winkler | 352/91 |
| 2,117,694 | 5/1938 | Becker | 352/217 |
| 3,419,325 | 12/1968 | Mayr | 352/91 |
| 3,049,048 | 8/1962 | Miyauchi | 352/91 |
| 2,556,770 | 6/1951 | Moore | 352/91 |
| 3,043,185 | 7/1962 | Manderfeld | 352/217 |
| 1,597,229 | 8/1926 | Ball | 352/91 |

*Primary Examiner*—Samuel S. Matthews
*Assistant Examiner*—Monroe H. Hayes
*Attorney*—Michael S. Striker

[57] ABSTRACT

A motion picture camera wherein the exposures with fade-out effect are automatically followed by a rearward transport of that length of film which was exposed during fade-out and the camera motor is arrested on completion of such rearward transport. The systems which adjust the diaphragm during fade-out, which reverse the direction of operation of the motor subsequent to fade-out, and which stop the motor on completion of rearward transport of the film receive motion from a programming disk which is indexed stepwise in response to operation of the film transporting mechanism as soon as the user moves an actuating knob to an operative position. The exposures with fade-in effect begin on movement of the actuating knob from its operative position and in response to depression of the camera release element.

31 Claims, 11 Drawing Figures

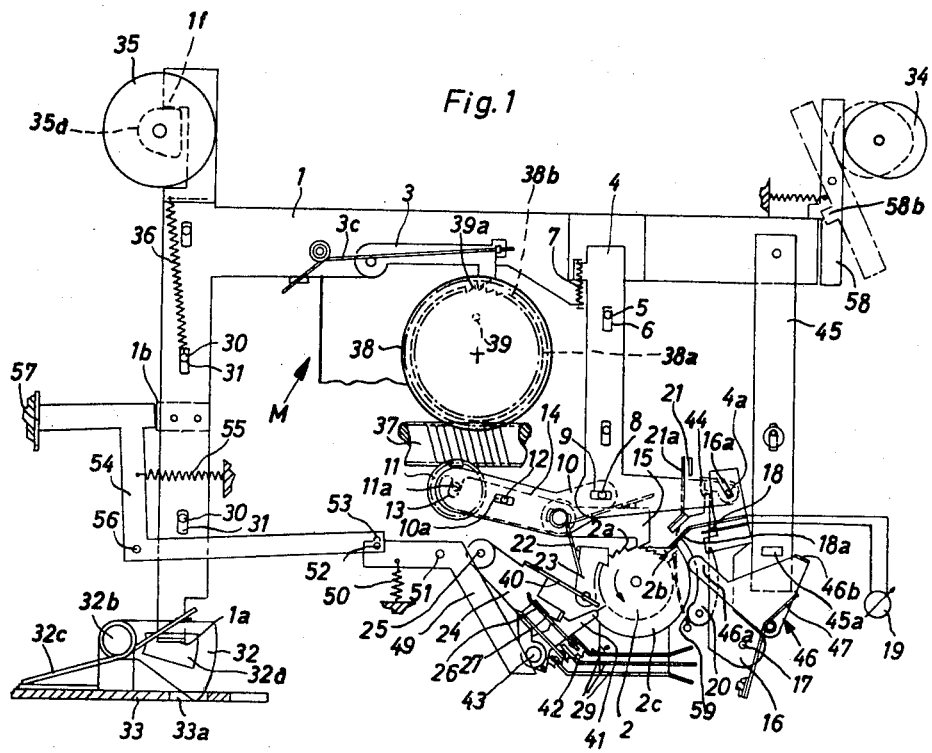
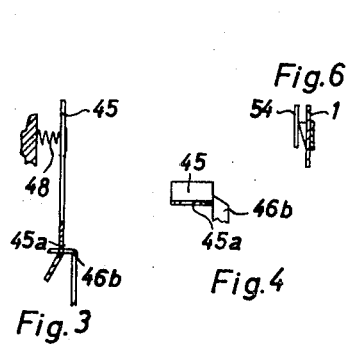
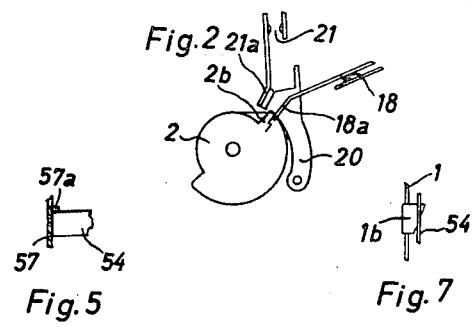

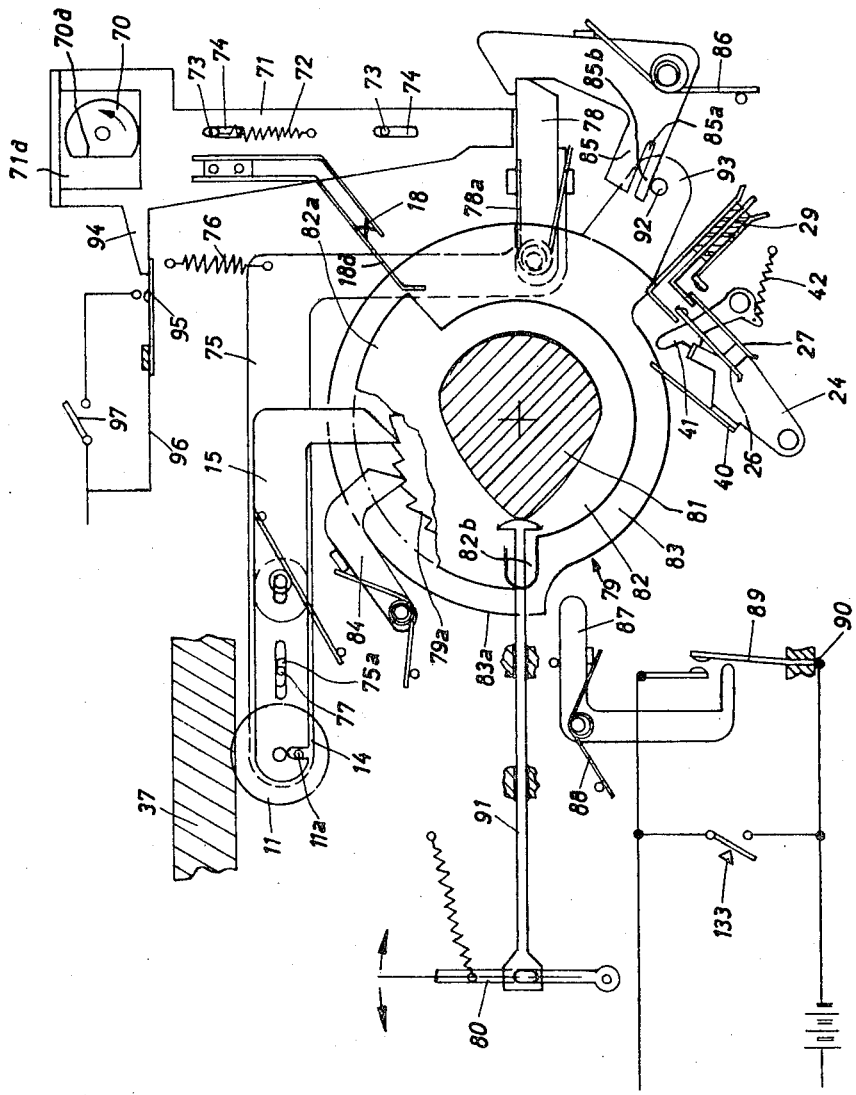

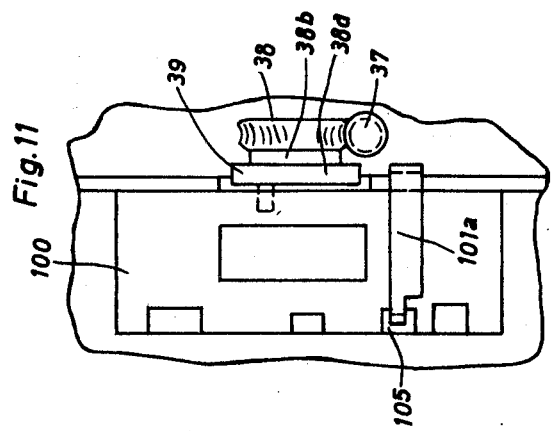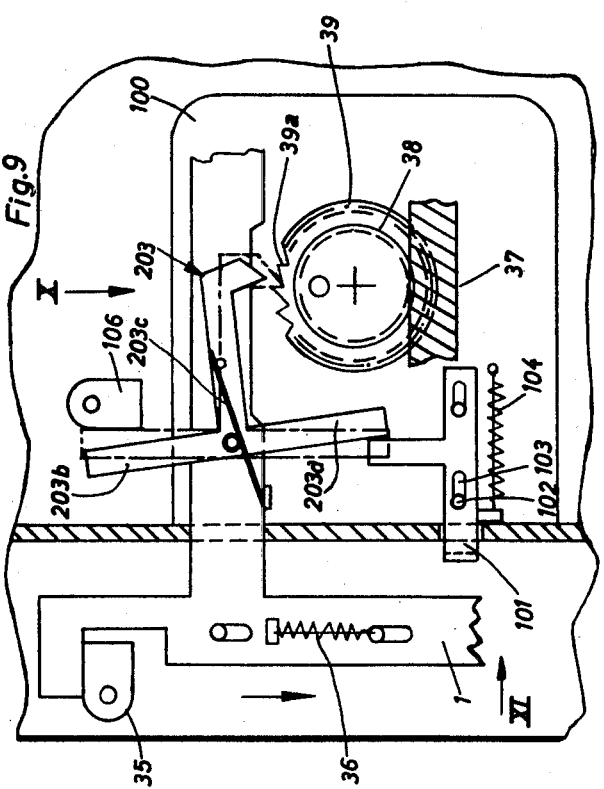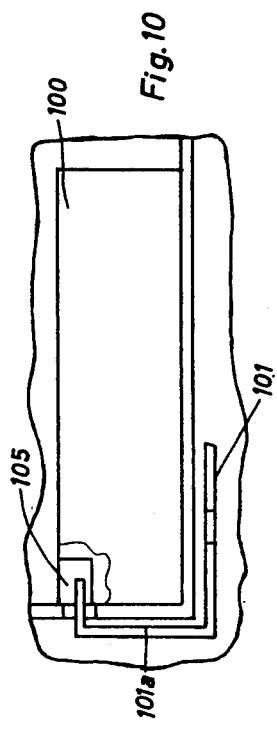

MOTION PICTURE CAMERA WITH FADING MEANS

BACKGROUND OF THE INVENTION

The present invention relates to improvements in cinematographic apparatus, and more particularly to improvements in motion picture cameras. Still more particularly, the invention relates to improvements in motion picture cameras which are provided with means for making exposures with fade-out and fade-in effect.

A drawback of presently known motion picture cameras with fading means is that the manipulation of various mechanisms which cooperate to make exposures with fade-out and fade-in effect is rather complicated. Thus, in certain cameras, the user must manually arrest the camera motor upon completion of fade-out; in certain other cameras, the user must manually rewind the film subsequent to completion of fade-out; and in certain further cameras which employ magazines wherein the takeup reel is rotatable in a single direction, the user must manually block the mechanism with rotates the takeup reel. This is cumbersome to the user, particularly to a novice, because the user must simultaneously hold the camera with one hand while the other hand performs still another operation which is necessary to make so-called trick shots.

SUMMARY OF THE INVENTION

An object of the invention is to provide a motion picture camera with novel and improved fading means which requires little attention on the part of the user, which insures that the exposures with fade-in effect are accurately superimposed upon the exposures with fade-out effect, and which can be used not only by beginners or inexperienced amateurs but also by advanced photographers.

Another object of the invention is to provide a motion picture camera which embodies the improved fading means and is constructed and assembled in such a way that it can readily accept all popular types of commercially available magazines or cassettes for motion picture film.

A further object of the invention is to provide a motion picture camera wherein the film which was exposed with fade-out effect is automatically transported rearwardly past the film gate prior to start of exposures with fade-in effect.

An additional object of the invention is to provide a motion picture camera which embodies several simple, reliable, inexpensive and advantageous safety features which render the operation of the camera practically foolproof and reduce the likelihood of damage and/or the likelihood of making unsatisfactory exposures when the camera is entrusted to a beginner.

Still another object of the invention is to provide a motion picture camera wherein the fading means can be used only when the camera motor is set to operate at a speed which is best suited for making exposures with fade-out and fade-in effect, or vice versa.

A further object of the invention is to provide novel and improved fading means which occupies little room and which can be used in cameras with electronically or mechanically adjustable diaphragms.

An additional object of the invention is to provide a motion picture camera with the novel fading means and to construct the camera in such a way that it can accept several types of magazines without necessitating any manual adjustment of fading means if a magazine is replaced with a different magazine.

Another object of the invention is to provide a motion picture camera wherein the exposures with fade-out and fade-in effect can be made by carrying out certain manipulations whose number is less than the number of manipulations necessary in presently known cameras with fading means.

The invention is embodied in a motion picture camera which comprises a film transporting mechanism including a prime mover which has a reversible electric motor, release means operable to start the motor, adjustable exposure control means defining a light-admitting aperture of variable size, and novel fading means for the making of exposures with fade-out and fade-in effect. The fading means comprises actuating means movable to and from an operative position in which it sets the fading means for operation with fade-out effect as soon as the motor is started in a forward direction, an indexible programming device (preferably a disk-shaped device which is indexible about a predetermined axis), coupling means for connecting the programming device to the prime mover means (e.g., to a worm of the prime mover means which is rotatable by the motor), adjusting means (which can be an electronic circuit or a mechanical adjusting system) cooperating with the programming device to adjust the exposure control means so that the aperture size gradually decreases to zero and the camera makes exposures with fade-out effect during indexing of the programming device through a first predetermined distance, reversing means controlled by the programming device and operative to change the direction of rotation of the motor in response to completion of indexing of the programming device through the first distance whereby the film transporting mechanism moves rearwardly that length of motion picture film which was exposed with fade-out effect, and arresting means for automatically stopping the motor in response to indexing of the programming device through such second predetermined distance which the programming device covers while the film transporting mechanism completes the rearward transport of that length of film which was exposed with fade-out effect. The adjusting means is arranged to automatically adjust the exposure control means to increase the aperture size in response to operation of the release means subsequent to stoppage of the motor by the arresting means and subsequent to movement of the actuating means from the operative position whereby the camera exposes with fade-in effect that length of film which was previously exposed with fade-out effect.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary diagrammatic partly sectional view of a motion picture camera embodying fading means which is constructed in accordance with a first embodiment of the invention and which is intended for use with magazines wherein the takeup reel is rotatable in a single direction;

FIG. 2 is a front elevational view of the programming device in the fading means of FIG. 1, further showing certain components which are controlled by the programming device;

FIG. 3 is a sectional view of a detail in the fading means of FIG. 1, showing the manner in which the input member of the fading means is locked during fade-out and during rearward transport of film prior to fade-in;

FIG. 4 is a different view of certain details in the structure of FIG. 3;

FIG. 5 illustrates the manner in which a mechanical control member cooperates with the exposure control means in the camera of FIG. 1;

FIG. 6 illustrates a further detail of the fading means of FIG. 1;

FIG. 7 is a different view of the detail shown in FIG. 6;

FIG. 8 is a fragmentary partly sectional view of a second motion picture camera which embodies modified fading means and which is intended to be used with magazines of the type wherein the takeup reel is rotatable in two directions;

FIG. 9 is a fragmentary sectional view of a camera which embodies a third fading means and which can be used with magazines of two types;

FIG. 10 is a view as seen in the direction of arrow X in FIG. 9; and

FIG. 11 is a view as seen in the direction of arrow XI in FIG. 9.

DESCRIPTION OF THE PREFERRED EMBODIMENTS

Referring first to FIGS. 1 to 7, and particularly to FIG. 1, there is shown a portion of a motion picture camera for use with 8-millimeter film. The camera comprises fading means for producing fade-out and fade-in effects, a mechanism for transporting the motion picture film forwardly and backwards (subsequent to completion of fade-out and prior to fade-in), and electronic adjusting means for regulating the aperture size of the exposure control means. Such adjusting means forms part of the fading means. The camera of FIG. 1 utilizes motion picture film which is stored in a cassette or magazine M of the type wherein the takeup reel cannot be rotated in a rearward direction. Thus, in order to produce a fade-out effect followed by a fade-in effect on that portion of film which was exposed during fade-out, the film which is being exposed during fade-out should not be convoluted onto the takeup reel because the latter cannot rotate in a direction to permit withdrawal of once-exposed film.

The film transporting mechanism of the motion picture camera comprises a prime mover including a reversible electric motor 19 which rotates a rotary driving member here shown as a worm 37 meshing with a worm wheel 38. The latter drives a disk 38a by way of a friction clutch 38b and the disk 38a has an eccentric motion transmitting pin 39 which can engage the core of the takeup reel in a properly inserted magazine M in a manner which is well known from the art. The disk 38a and its pin 39 constitute the output member of the prime mover in the film transporting mechanism. As stated above, the takeup reel in the magazine M can rotate only in a forward direction, namely, in a direction to collect the film which is being paid out by the supply reel and is transported past the film gate by a suitable claw pull-down or an analogous film feeding device of the film transporting mechanism.

The diaphragm 57 forms part of the exposure control means in the motion picture camera and is of the type which can be adjusted by electronic means to furnish apertures of requisite size. The diaphragm 57 can be fully closed on completion of fade-out to prevent entry of scene light during rearward transport of the once-exposed length of film prior to start of exposures with fade-in effect.

FIG. 1 illustrates the automatic fading means for producing fade-out and fade-in effects in an operative condition. The positions which the components of the fading means assume correspond to those upon completion of rearward transport of film subsequent to fade-out. The fading means comprises an input member here shown as a bell crank lever 1 having a horizontal arm and a vertical arm and being movable in the longitudinal direction of its vertical arm between the illustrated first or lower end position and a second or upper end position. The lever 1 serves to place into readiness certain components of the fading means in order to start a fade-out effect. The fading means further comprises a rotary indexible programming device 2 (hereinafter called disk for short) which control the sequence of movements of several components of the fading means.

The horizontal arm of the lever 1 supports a pivotable blocking pawl 3 whose pallet can engage the teeth 39a of the disk 38a to hold the latter against rotation in a direction to drive the takeup reel in the magazine M. Thus, when the pallet of the blocking pawl 3 engages the teeth 39a of the disk 38a while the motor 19 is on and is set to rotate the worm 37 in a forward direction, the friction clutch 38b allows the worm wheel 38 to rotate with reference to the disk 38a and the aforementioned claw pull-down transports the motion picture film stepwise past the film gate whereby the thus transported film accumulates in the interior of the magazine M but is not convoluted on the takeup reel. The internal chamber of the magazine M is large enough to accommodate a predetermined length of motion picture film which is not convoluted on the supply and/or takeup reel.

A helical spring 7 connects the horizontal arm of the lever 1 to a vertically reciprocable coupling lever 4 which has elongated slots 6 for fixedly mounted guide pins 5. The coupling lever 4 is reciprocable at right angles to the longitudinal direction of the horizontal arm of the lever 1. The coupling lever 4 is connected to a further lever 10 by means of a pin-and-slot connection 8, 9; the lever 10 carries a rotary gear 11 and is pivotable on a pin 12. As shown, the lever 10 has an elongated slot 10a for the pin 12 so that it can perform pivotal as well as limited translatory movements with reference to the pin 12. The gear 11 has an eccentric 11a which extends into a notch or slot 13 provided in a lever 14. The latter is adjacent to the lever 10 and is movable lengthwise of the pin 12. The lever 14 has an indexing pawl 15 which can rotate the disk 2 stepwise in a counterclockwise direction, as viewed in FIG. 1. The disk 2 has an annulus of ratchet teeth 2a which cooperate with the pallet of the pawl 15. The parts 4-15 constitute a coupling assembly which connects the prime mover 19, 37, 38, 38a, 38b, 39 of the film transporting mechanism with the disk 2 in the illustrated position of the lever 1.

The coupling lever 4 has a horizontal arm which carries a pin 4a extending into an inclined slot 16a provided in a contact lever 16 which is turnable on a pivot pin 17. The lever 16 supports the contact 18a of an arresting switch 18 which must be opened in order to open the circuit of the motor 19. In the position shown in FIG. 1, the contact 18a is located behind a lobe or trip 2b of the disk 2 (see also FIG. 2) so that the arresting switch 18 is open. The lobe 2b of the disk 2 can cooperate with a second contact lever 20 which carries the contact 21a of a switch 21 forming part of the electronic adjusting circuit for the diaphragm 57. + (+ U.S. Pat. No. 3,419,325 discloses an electronic adjusting circuit of the used type) The teeth 2a of the disk 2 further cooperate with a locating pawl 23 which is coupled to the indexing pawl 15 by a spring 22. The spring 22 urges the pallet of the locating pawl 23 against the teeth 2a. The purpose of the pawl 23 is to lock the disk 2 in an end position. The disk 2 further cooperates with the carrier 24 which forms part of a reversing means for the motor 19 and supports several electric contacts. The carrier 24 is pivotable on a pin 25. The contacts 26, 27 of the carrier 24 engage the contacts of a selector 29 under the action of a spring 50 which biases a bell crank lever 49. The selector 29 also forms part of reversing means which can change the direction of rotation of the motor 19.

The vertical arm of the lever 1 has aligned vertical slots 31 for fixedly mounted guide pins 30. The lower end portion of this vertical arm has a bent-over projection or lug 1a which is received in an opening 32a provided in a locking member 32 pivoted at 32b and biased by a torsion spring 32c so that one of its corner portions extends into a slot 33a of the camera release element 33. When the lever 1 is caused to move upwardly, as viewed in FIG. 1, its lug 1a pivots the locking member 32 in a counterclockwise direction to thereby free the release element 33.

The operation:

The user of the camera rotates a master switch 34 to connect the circuit of the motor 19 with a suitable energy source. The user thereupon rotates an actuating knob 35 to the illustrated operative position whereby a follower 1f of the lever 1 tracks a cam 35a of the knob 35 and a spring 36 pulls the lever 1 downwardly to the illustrated lower end position. The lug 1a at the lower end of the vertical arm of the lever 1 is thereby moved downwardly and enables the spring 32c to move the corner portion of the locking member 32 against the upper side of the release element 33 (not into the slot 33a).

As the lever 1 moves downwardly, the coupling lever 4 follows such movement and slides along the guide pins 5 to pivot the lever 10 in a direction to place the gear 11 into mesh with the worm 37 of the prime mover. At the same time, the indexing pawl 15 engages the adjacent teeth 2a of the programming disk 2 and the pin 4a of the lever 4 displaces the contact lever 16 by moving in the latter's slot 16a. The contact lever 16 is moved toward the disk 2 so that the contact 18a of the arresting switch 18 moves against the lobe 2b and the switch 18 closes. Such positions of the lever 16 and arresting switch 18 are shown in FIG. 2. Also, the downwardly moving lever 1 causes the pallet of the blocking pawl 3 to engage the adjacent teeth 39a of the disk 38a so that the pin 39 is unable to drive the core of the takeup reel in the magazine M.

The fade-out effect is started in response to depression of the release element 33. The corner portion of the locking member 32 enters the slot 33a of the release element 33 and holds the latter in the operative or depressed position shown in FIG. 1. From there on, the fade-out effect proceeds automatically followed by automatic rearward transport of that length of film which was exposed during fade-out. The claw pull-down transports the film forwardly during fade-out but the pin 39 cannot drive the takeup reel in the magazine M so that the film is simply looped in the interior of the magazine and accumulates downstream of the film gate. The claw pull-down receives motion from the motor 19 which also drives the worm 37 whereby the eccentric pin 11a of the gear 11 (which meshes with the worm 37) drives the lever 14 back and forth so that the pawl 15 indexes the disk 2 in a counterclockwise direction, as viewed in FIG. 1. Each revolution of the gear 11 corresponds to a stepwise angular movement of the disk 2 by the width of a tooth 2a. During such indexing of the disk 2, the lobe 2b moves the contact lever 20 against the opposition of a spring 59 until the lever 20 closes the switch 21 of the adjusting means for the diaphragm 57. The horizontal arm of the coupling lever 4 carries a pawl 44 which then engages the contact lever 20 and holds it in the position in which the switch 21 is closed. As the switch 21 closes, the effective size of the aperture of the diaphragm 57 begins to decrease to thus produce the fade-out effect. The rate at which the aperture size decreases is determined in advance by the construction of the electronic adjusting means including the switch 21. The exact construction of such adjusting means forms no part of the present invention.

When the disk 2 covers an angular distance corresponding to one-half of a full revolution in a counterclockwise direction, it causes the selector 29 of the reversing means to reverse the direction of operation of the motor 19. The aforementioned claw pull-down then transports rearwardly that length of film which was exposed during fade-out while the diaphragm 57 remains closed to prevent entry of scene light. The claw pull-down transports the film rearwardly past the film gate so that the film accumulates in the region of the supply reel in the magazine M. Shortly before the disk 2 completes the first half of a revolution, its lobe 2b engages a leaf spring 40 of the contact carrier 24. Prior to such engagement between the lobe 2b and the leaf spring 40, the carrier 24 is held by a pawl 41 in the position in which the motor circuit is set for forward operation of the motor 19. The pawl 41 is biased by a spring 42 so that it tends to turn on a pivot pin 43. As the lobe 2b engages the leaf spring 40, the latter begins to store energy and, when the disk 2 actually completes one-half of its revolution in a counterclockwise direction, the leaf spring 40 is stressed sufficiently to disengage the carrier 24 from the pawl 41 whereby the carrier suddenly assumes the other end position in which the motor 19 is set for operation in reverse. The contacts 26, 27 of the carrier 24 then engage those contacts of the selector 29 which are not engaged in the position of the carrier 24 as shown in FIG. 1. From there on, the carrier 24 is held in the second end position by a cam face 2c provided on the disk 2 and extending along an arc of 180°. The disk 2 continues to turn in a counterclockwise direction after the direction of operation of the motor 19 is reversed. When this disk completes a full revolution, the lobe 2b engages the contact 18a of the lever 16 and opens the arresting switch 18 to bring the motor 19 to a full stop. Such stoppage of the motor 19 takes place subsequent to completed rearward transport of that length of film which was exposed with fade-out effect. Shortly before the arresting switch 18 opens, the leaf spring 40 becomes disengaged from the cam face 2c of the disk 2 whereby the carrier 24 suddenly returns to its initial position in which the motor 19 is set for operation in the normal or forward direction. Such abrupt return movement of the carrier 24 to its original position takes place under the action of the leaf spring 40 which has stored energy in a manner as described above. The pawl 41 then reengages the carrier 24 and holds it in the original position. The stoppage of motor 19 requires an extremely short interval of time which is desirable to insure that the length of that portion of the film which is to be exposed with fade-in effect is identical with that which was previously exposed with fade-out effect, i.e., that the motor 19 is arrested at the exact moment when the rearward transport of the once-exposed length of film (namely, of the length which was exposed with fade-out effect) is completed.

It will be seen that the fade-out effect takes place during rotation of the disk 2 through a first half revolution and that the rearward transport of the film which was exposed with fade-out effect takes place while the disk rotates through the second half of a full revolution in a counterclockwise direction, as viewed in FIG. 1.

The fade-in effect is produced as follows: The master switch 34 must be closed and the user turns the actuating knob 35 in a counterclockwise direction through 90° so that the knob 35 leaves the illustrated operative position and its cam 35a lifts the lever 1 to the upper end position. The lug 1a of the vertical arm of the lever 1 pivots the locking member 32 in a counterclockwise direction so that the locking member is withdrawn from the slot 33a of the release element 33. Also, the upward movement of the lever 1 causes the coupling lever 4 to disengage the gear 11 from the worm 37 and to disengage the pawl 15 from the teeth 2a of the disk 2. The pawl 44 is disengaged from the contact lever 20 so that the switch 21 of the adjusting means opens. The user then depresses the release element 33 to start the motor 19 which transports the film in a forward direction (by way of the claw pull-down) whereby the film is exposed with fade-in effect and is collected by the takeup reel because the latter's core is driven by the eccentric pin 39 of the disk 38a. The effective size of the aperture defined by the diaphragm increases gradually on opening of the switch 21 and on actuation of the element 33 at the same rate at which it closes during the making of exposures with fade-out effect.

In summation, the making of exposures with fade-out effect and thereupon with fade-in effect necessitates the following manipulations: Closing of the master switch 34, rotating the actuating knob 35 to the illustrated operative position, depressing the release element 33 to start the fade-out effect and thereupon the rearward transport of the once-exposed length of the film, rotating the actuating knob 35 through 90° away from its operative position, and pressing the release element 33 to start the exposures with fade-in effect.

The camera of FIG. 1 is further provided with several optional safety features to prevent or to reduce the likelihood of improper manipulation. The horizontal arm of the lever 1 carries a holding lever 45 which is parallel to the coupling lever 4 and whose lower end portion is bent, as best shown in FIG. 3, and is provided with a slot 45a. A holding pawl 46 has a first extension 46a which is urged against the disk 2 by a torsion spring 47, and a second extension 46b which is bent at an angle of 90° (see FIG. 3) and which enters the slot 45a of the holding lever 45 when actuating knob 35 assumes the operative position shown in FIG. 1, i.e., when the fade-out effect is to begin. Shortly before the disk 2 completes a full revolution, i.e., subsequent to completion of exposures with fade-out effect, a further lobe (not shown) of the disk 2 pivots the pawl 46 against the opposition of the spring 47 so that the extension 46b is expelled from the slot 45a. To this end, the extension 46b has a suitably inclined cam face (see FIG. 4) which slides along an internal surface of the holding lever. While the extension 46b extends into the slot 45a in a manner as shown in FIG. 3, the parts 45, 46 cooperate to prevent upward movement of the lever 1, i.e., the actuating knob 35 is arrested in the illustrated position to prevent premature starting of fade-in. Such fade-in can begin only after the completion of rearward transport of film which was exposed with fade-out effect.

The camera of FIG. 1 is further provided with means for preventing the opening of the diaphragm 57 prior to start of exposures with the fade-in effect. Thus, the diaphragm 57 remains closed while the camera is idle following rearward transport of film which was exposed with fade-out effect. When the disk 2 completes one-half of its revolution in a counterclockwise direction (termination of exposures with fade-out effect), the carrier 24 is pivoted away from the disk 2 in a manner as described above and is pressed against the bell crank lever 49 so that the latter turns on the pin 51 in a clockwise direction, as viewed in FIG. 1, and stresses the spring 50. The lever 49 is coupled with a diaphragm controlling lever 54 by means of a pin-and-slot connection 52, 53 and, when the lever 49 pivots in a clockwise direction, it causes the lever 54 to pivot on a fixedly mounted pin 56 and to stress a helical spring 55. The lever 54 then blocks the diaphragm 57 in closed position (see FIG. 1) or moves beyond a projection 57a of the diaphragm 57 to hold the latter in closed position (see FIG. 5). The diaphragm 57 is held in such closed position during the entire interval which is required for rearward transport of the film which was exposed with fade-out effect. However, the diaphragm controlling lever 54 should remain in the blocking position after the disk 2 completes a full revolution and reassumes a starting position in which the carrier 24 is caused to become disengaged from the bell crank lever 49. To this end, the lever 54 is held only by the vertical arm of the lever 1. The lever 54 exhibits some elasticity and bears, as a result of such innate elasticity, against the vertical arm of the lever 1 before it assumes the blocking position (see FIG. 6). When the lever 54 is thereupon moved to the blocking position (by the bell crank lever 49), it moves behind an inclined projection 1b of the vertical arm of the lever 1 and is retained in blocking position until the lever 1 is caused to move upwardly. The lever 1 then disengages the lever 54 from the diaphragm 57 and allows the lever 54 to assume its idle or unblocking position. The slot 53 enables the bell crank lever 49 to follow the movement of the diaphragm controlling lever 54 to idle position.

Still further, the camera of FIG. 1 is provided with means for preventing rotation of the actuating knob 35 from its operative position in the open position of the master switch 34. Such movement of the actuating knob 35 from its operative position would result in opening of the diaphragm 57 subsequent to completion of rearward transport of film which was exposed with fade-out effect. There is provided a blocking lever 58 which is biased by a spring and serves to hold the horizontal arm of the lever 1 against movement to the upper end position when the master switch 34 is off. This is clearly shown in the upper right-hand portion of FIG. 1. The lever 58 has a lug 58b which is located above the horizontal arm of the lever 1 when the switch 34 is off. The switch 34 has a cam which pivots the lever 58 to the inoperative position (indicated by phantom lines) when the switch 34 connects the motor circuit with the energy source.

The lever 10 for the gear 11 is reciprocable within limits along the pin 12 (due to the provision of the slot 10a). In addition, the lever 10 is coupled to the lever 4 by the pin-and-slot connection 8, 9. This insures that, when the gear 11 fails to immediately move into mesh with the worm 37, the lever 10 can yield to permit movement of the gear 11 into proper mesh with the member 37.

FIG. 8 illustrates a portion of a motion picture camera for use with magazines or cassettes of the type wherein the takeup reel is rotatable in two directions. The rotary actuating member 70 which replaces the knob 35 of FIG. 1 is a wiper which is turnable in the opening 71a of a slide 71. This slide constitutes the input member of the fading means shown in FIG. 2. A spring 72 biases the slide 71 against the periphery of the wiper 70 and the slide has elongated slots 74 for fixedly mounted guide pins 73. A coupling lever 75 is biased in a counterclockwise direction by a helical spring 76 and is pivotable in a pin 77 extending through an elongated slot 75a. Thus, the coupling lever 75 has limited freedom of reciprocatory movement with reference to and is also pivotable on the pin 77. The lower end portion of the vertical arm of the coupling lever 75 carries an intermediate lever 78 which abuts against a lower edge face of the slide 71 and is biased by a torsion spring 78a which reacts against the coupling lever 75. The coupling lever 75 further carries the lever 14, the gear 11 which can mesh with the worm 37, and the indexing pawl 15 which cooperates with the teeth 79a of a modified indexible programming disk 79. The manner in which the pin 11a of the gear 11 cooperates with the lever 14 to cause the pawl 15 to index the disk 79 is analogous to that described in connection with FIG. 1.

The basic function of the disk 79 is the same as that of the disk 2; however, the construction of the disk 79 is somewhat different in order to enable it to be used in the modified camera of FIG. 8 wherein the worm 37 can rotate the takeup reel in the magazine (not shown) in two directions. The disk 2 of FIG. 1 initiates the closing of diaphragm 57 to start the making of exposures with fade-out effect, and the disk 2 also controls the rearward transport of that length of film which was exposed with fade-out effect. Therefore, the disk 2 comprises two sectors each of which extends along an arc of 180°.

The camera of FIG. 8 comprises a diaphragm 80 which comprises a plurality of vanes or blades which can open and close and remain closed during rearward transport of the film subsequent to fade-out. The programming disk 79 can be said to comprise three sectors each of which extends along an arc of 120°. In the illustrated embodiment, the disk 79 is a composite body comprising three coaxial disk-shaped elements including a first disk-shaped element 81 which controls the blades of the diaphragm 80, a second disk-shaped element 82 which programs the sequence of various operations, and a third disk-shaped element 83 which serves as a disengaging element. The three disk-shaped elements are closely adjacent to each other and rotate as a unit in response to operation of the indexing pawl 15 which cooperates with the teeth 79a of the disk 79. A locating pawl 84 can hold the disk 79 in its starting position. The disk 79 can effect closing and opening of the arresting switch 18 and pivoting of the contact carrier 24 which cooperates with the selector 29 of the reversing means for the motor substantially in the same way as described in connection with FIG. 1.

FIG. 8 illustrates the parts of the fading means in positions they assume when the camera is ready to make exposures with fade-out effect. The wiper 70 has been rotated to the illustrated operative position whereby the slide 71 caused the spring 72 to store energy during movement of the slide to its lower position. Such turning of the wiper 70 can take place while the motor of the camera is running, i.e., while the user makes normal exposures, or prior to starting of the motor. As the slide 71 moves downwardly, the intermediate lever 78 causes the coupling lever 75 to pivot in a clockwise direction and to move the gear 11 into mesh with the worm 37. At the same time, the indexing pawl 15 engages the adjacent teeth 79a of the disk 79. When the slide 71 descends toward the position shown in FIG. 8, the tip of the intermediate lever 78 slides over a suitably inclined hooked end portion of a retaining lever 85 which is biased by a torsion spring 86 and serves to automatically hold the intermediate lever 78 in the illustrated position, i.e., to maintain the gear 11 in mesh with the work 37 and to maintain the indexing pawl 15 in engagement with the teeth 79a of the programming disk 79. The arresting switch 18 is mounted directly on the slide 71 and is normally closed; when the slide 71 reaches the illustrated lower end position, the longer contact 18a of the arresting switch 18 is located in the path of movement of a lobe 82b on the median element 82 of the disk 79.

It is assumed that the user decided to rotate the wiper 70 and to move the slide 71 to the illustrated position while the motor 19 (not shown) was idle. The user then depresses the release element 133 which, in the embodiment of FIG. 8, is a magnetic switch. Closing of the switch 133 results in rotation of the worm 37 whereby the gear 11 effects intermittent or stepwise indexing of the disk 79 in a counterclockwise direction, as viewed in FIG. 8. The disk-shaped element 83 has a cam 83a which extends along an arc of 240 degrees and pivots of closing lever 87 against the opposition of a torsion spring 88 whereby the lower arm of the closing lever 87 permits automatic closing of a second or auxiliary switch 89 which is connected in parallel with the release element or switch 133. This permits the user to remove his or her finger from the knob of the switch 133, i.e., the switch 133 can open but the motor circuit 90 remains completed because the closing lever 87 permits closing of the auxiliary switch 89. The latter remains closed during the interval which is required for making of exposures with fade-out effect and for rearward transport of film which was exposed with fade-out effect.

The element 81 of the disk 79 is operatively connected with the diaphragm 80 by means of an adjusting rod 91 which is inherently elastic or is biased by suitable resilient means so that it permanently engages the peripheral surface of the element 81. As the disk 79 turns anticlockwise through the first 120°, the corresponding portion of the peripheral surface on the element 81 causes the adjusting rod 91 to gradually reduce the size of the aperture which is defined by the diaphragm 80 so that the exposures are made with fade-out effect. Thus, the curvature of the surface on the element 81 determines the rate at which the aperture size varies during fade-out. As the disk 79 thereupon rotates through the next 120°, the follower at the right-hand end of the adjusting rod 91 tracks that portion of the peripheral surface of the element 81 whose center of curvature is located on the axis of the disk 79; therefore, the aperture size remains unchanged (this aperture size is then zero because the diaphragm 80 should not admit scene light during rearward transport of the film subsequent to fade-out and preceding the exposures with fade-in effect). In other words, that portion of the peripheral surface on the element 81 which is tracked by the adjusting rod 91 during the second third of the revolution of the disk 79 forms part of a circular cylindrical surface.

In order to automatically set the motor for operation in reverse when the exposures with fade-out effect are completed, the element 82 of the disk 79 has a cam 82a which extends along an arc of 120° and engages the leaf spring 40 on the carrier 24 after the disk 79 completes an angular movement through the first 120°. The carrier 24 is then pivoted and causes the selector 29 to reverse the direction of operation of the camera motor. The film is transported in a rearward direction, i.e., it is being paid out by the takeup reel which has collected the film during the making of exposures with fade-out effect. The disk 79 continues to turn stepwise in a counterclockwise direction.

The selector 29 is automatically adjusted to reset the camera motor for operation in a forward direction when the disk 79 completes an angular movement through 240°. This is effected abruptly by the leaf spring 40 of the carrier 24 which is then released by the cam 82a of the element 82. Shortly thereafter, the lobe 82b engages the longer arm 18a of the arresting switch 18 and opens this switch to automatically stop the motor. Thus, the rearward transport of film is completed automatically as soon as the entire length of film which was exposed with fade-out effect has been withdrawn from the takeup reel. At the same time, the cam 83a of the element 83 has moved beyond the adjacent arm of the lever 87 so that the latter is pivoted by the torsion spring 88 and opens the auxiliary switch 89 to open the motor circuit 90.

The user thereupon rotates the wiper 70 in a counterclockwise direction through an angle of 90°. The flat 70a on the wiper 70 then permits the spring 72 to move the slide 71 to its upper end position. However, the gear 11 remains in mesh with the worm 37 and the indexing pawl 15 remains in engagement with the teeth 79a of the disk 79 because the retaining lever 85 holds the intermediate lever 78 in the illustrated position. Therefore, as the user thereupon closes the release element or switch 133, the motor drives the worm 37 in a direction to wind the film onto the takeup reel and the pawl 15 continues to index the disk 79 whereby the follower of the adjusting rod 91 tracks that section of the peripheral surface on the element 81 which allows for gradual opening of the diaphragm 80 to produce the fade-in effect. This effect is being produced while the disk 79 turns through the last third of its revolution in a counterclockwise direction. As soon as the disk 79 completes a full revolution, the diaphragm 80 is fully open (the exposures with fade-in effect are terminated) and the gear 11 is automatically disengaged from the worm 37 without necessitating any, even short-lasting, stoppage of the camera motor. This is due to the provision of an outwardly projecting extension or arm 93 which is part of the disk 79 and carries a post or stud 92 serving to pivot the retaining lever 85 against the opposition of the spring 86 so that the lever 85 releases the intermediate lever 78. This enables the spring 76 to pivot the coupling lever 75 in a direction to disengage the gear 11 from the worm 37 and to simultaneously disengage the pallet of the indexing pawl 15 from the adjacent tooth 79a of the disk 79. The lever 85 has a slot 85a separating its lower arm from an adjustable tongue 85b which can be deformed to insure that the post 92 disengages the lever 85 from the intermediate lever 78 during an interval between two successive indexing movements of the disk 79. This insures that, when the slide 71 is again moved to the position shown in FIG. 8, the pallet of the indexing pawl 15 automatically enters a space between the two adjacent teeth 79a of the disk 79. The circular pitch of the toothed portion of the disk 79 and the transmission ratio between the post 92 of the arm 93 and the lever 85 must also be selected in a way to insure such immediate engagement between the indexing pawl 15 and teeth 79a when the slide 71 is caused to return to the illustrated position.

It will be noted that the sequence of manipulations required to produce fade-out and fade-in effects with the camera of FIG. 8 is identical with that described in connection with FIG. 1. Thus, the user moves the wiper 70 to the position shown in FIG. 8, the camera release element 133 is depressed to start the making of exposures with fade-out effect, the wiper 70 is turned through 90° when the motor is automatically arrested subsequent to rearward transport of the once-exposed length of film, and the release element 133 is actuated again to start the making of exposures with fade-in effect. The making of normal exposures follows the last exposure with fade-in effect and continues as long as the user maintains the release element 133 in depressed position.

The camera of FIG. 8 also comprises means for preventing or for reducing the likelihood of improper manipulation, for example, by beginners. This camera is provided with means for changing the motor speed and with means for preventing the making of exposures with fade-out or fade-in effect while the motor is operated at the higher or highest speed. This is achieved by the provision of a regulating arm 94 which is integral with or rigidly secured to the slide 71 and serves as a trip to open a normally closed switch 95 in the speed changing circuit 96 of the motor. The circuit 96 is completed by a switch 97 when the user wishes to operate the motor at the higher speed. Thus, if the switch 97 is not open while the user rotates the wiper 70 to move it to the position shown in FIG. 8, the regulating arm 94 of the slide 71 automatically opens the circuit 96 to prevent operation of the camera motor at the higher speed while the camera is to make exposures with fade-out and fade-in effect.

The blocking pawl 3 of FIG. 1 is not needed in the camera of FIG. 8 because this camera is intended for use with magazines wherein the takeup reel can rotate in two directions. The camera of FIGS. 9 to 11 is designed to be used with both types of magazines; therefore, this camera comprises a blocking pawl 203 which is adjustable between an operative and an inoperative position. The adjustments of the pawl 203 are effected automatically by the magazine or manually by means of an eccentric 106 or the like. The magazine 100 can pivot an arm 203a of the blocking pawl 203 through the intermediary of a motion transmitting slide or detector 101. The latter is reciprocable in the direction of insertion of the magazine 100 into the camera body and is provided with elongated slots 103 for fixedly mounted guide pins 102. A spring 104 biases the slide 101 to its right-hand end position, as viewed in FIG. 9, whereby the upwardly extending arm of the slide 101 engages the arm 203a of the blocking pawl 203 to hold the pallet of the blocking pawl away from engagement with the teeth 39a of the disk 38a. The pawl 203 assumes the inoperative position of FIG. 1 when the magazine 100 contains a takeup reel which is rotatable in two directions. The slide 101 has a U-shaped portion 101a which straddles a portion of the magazine 100 and whose tip extends into a coding notch 105 provided in the front wall or panel of the magazine (see FIGS. 10 and 11). Thus, when the magazine 100 is properly inserted into the body of the camera shown in FIG. 9, the blocking pawl 203 is automatically disengaged from the teeth 39a so that the worm 37 can rotate the takeup reel in either direction, in the same way as in the camera of FIG. 8.

A magazine M (not shown in FIGS. 9–11) containing a takeup reel which is rotatable in a single direction (to collect the exposed motion picture film) does not have a coding notch 105. Therefore, when the magazine M is inserted in place of the magazine 100, its front panel shifts the portion 101a of the slide 101 whereby the latter follows such movement of the portion 101a and stresses the spring 104. At the same time, the upwardly extending arm of the slide 101 allows a spring 203c to pivot the blocking pawl 203 in a clockwise direction so that the pallet of the blocking pawl engages the teeth 39a and prevents rotation of the disk 38a in response to rotation of the worm 37. Thus, the takeup reel is held at a standstill while the exposures are made with fade-out effect and the film which is transported by the claw pull-down during fade-out is loosely looped in the magazine M downstream of the film gate. Such film is transported rearwardly in response to automatic reversal of the direction of rotation of the motor 19 in the same way as described in connection with FIG. 1. The pallet of the blocking pawl 203 is automatically disengaged from the teeth 39a when the lever 1 is moved to its upper end position, i.e., when the camera is ready to make exposures with fade-in effect.

The blocking pawl 203 can be pivoted manually by means of the eccentric 106. To this end, the blocking pawl 203 comprises a second arm 203b which can be engaged by the eccentric 106 when the latter is turned through 90° in a clockwise direction, as viewed in FIG. 9, to thereby disengage the pallet of the pawl 203 from the teeth 39a. When the eccentric 106 is returned to the position shown in FIG. 9 (or to a position at 180° from such position), the blocking pawl 203 is free to engage the teeth 39a if the camera body accommodates a magazine 100. The provision of the eccentric 106 constitutes a safety feature which is desirable when the camera is to use magazines which are not provided with coding means.

It is clear that the improved camera is susceptible of many additional modifications without departing from the spirit of the present invention. For example, the safety features described in connection with FIG. 1 can be used in the camera of FIG. 8 and/or 9, or vice versa. Moreover, the embodiment of FIG. 8 can also comprise an adjustable blocking pawl (corresponding to the member 203 of FIG. 9) so as to enable the camera to accept magazines with takeup reels which are rotatable in a single direction or in two directions. Furthermore, the programming disk 2 or 79 can be replaced with a camshaft or another suitable indexible programming device which can control the sequence of various operations during fade-out, following the fade-out, and during fade-in in the aforedescribed manner.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the claims.

What is claimed as new and desired to be protected by Letters Patent is set forth in the appended

1. In a motion picture camera, a combination comprising a film transporting mechanism including a prime mover having a reversible electric motor, a rotary worm which is driven by said motor, and means for rotating the takeup reel of a film-containing magazine at least while said worm is rotated in a first direction corresponding to the operation of said motor during forward transport of motion picture film; release means operable to start said motor; adjustable diaphragm means defining a light-admitting aperture of variable size; and fading means including actuating means movable to and from an operative position in which said actuating means sets the fading means for operation with fade-out effect in response to starting of said motor in a forward direction, an indexible rotary programming unit, coupling means for connecting said rotary unit to said prime mover in response to movement of said actuating means to said operative position, said coupling means comprising a coupling lever, a rotary gear mounted on said coupling lever and engageable with said worm, and a pawl driven by said gear for rotating said rotary unit to thereby index said rotary unit when said worm rotates, adjusting means cooperating with said rotary unit to adjust said diaphragm means so that the aperture size gradually decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, and arresting means for automatically stopping said motor in response to indexing of said rotary unit through such second distance which said rotary unit covers while said film transporting mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes the fade-in effect that length of film which was previously exposed with fade-out effect.

2. A combination as defined in claim 1, further comprising master switch means in circuit with said motor and blocking means for preventing movement of said actuating means from said operative position in the open position of said master switch means.

3. A combination as defined in claim 1, wherein said adjusting means comprises an electronic control circuit including switch means and said rotary unit comprises trip means for actuating said switch means in response to indexing of said rotary unit upon connection thereof to said prime mover and after said release means starts said motor whereby said circuit effects said gradual reduction in the size of said aperture.

4. A combination as defined in claim 3, wherein said rotary unit is indexible about a predetermined axis and said trip means comprises a projection on said rotary unit.

5. A combination as defined in claim 1, wherein said reversing means comprises a carrier movable between first and second positions to thereby respectively set said motor for operation in forward and reverse directions, said rotary unit having means for maintaining said carrier in said second position while said rotary unit is being indexed through said second distance.

6. A combination as defined in claim 5, wherein said carrier is provided with switch contacts and said means for maintaining the carrier in said second position is a cam which retains the carrier in such second position while the rotary unit is indexed through said second distance.

7. A combination as defined in claim 5, wherein said reversing means further comprises means for permanently biasing said carrier to said first position.

8. A combination as defined in claim 1, wherein said arresting means comprises normally closed switch means in the circuit of said motor and said rotary unit comprises means for opening said switch means upon completion of indexing movement through said second distance.

9. A combination as defined in claim 1, wherein said diaphragm means comprises at least one vane movable between a plurality of positions to thereby change the size of said aperture, said adjusting means comprising an adjusting member receiving motion from said rotary unit and operative to move said vane in a direction to reduce the aperture size in response to indexing of said rotary unit through said first distance.

10. A combination as defined in claim 9, wherein said programming device is indexible about a predetermined axis and includes a plurality of coaxial elements one of which transmits motion to said adjusting member.

11. A combination as defined in claim 1, wherein said fading means further comprises input means for operating said coupling means in response to movement of said actuating means to said operative position whereby said coupling means connects said prime mover with said rotary unit.

12. A combination as defined in claim 11, wherein said actuating means comprises a knob which is rotatable to and from said operative position, said input means comprising a movable member which is operatively connected with said coupling means and operates said coupling means in response to rotation of said knob from said operative position.

13. A combination as defined in claim 11, wherein said coupling lever is connected with and is pivotable by said input means.

14. A combination as defined in claim 1, further comprising retaining means for holding said coupling means in an operative position in which said coupling means connects said rotary unit with said prime mover while said rotary unit is indexed during fade-in and while said actuating means is out of said operative position.

15. A combination as defined in claim 14, wherein said rotary unit comprises means for disengaging said retaining means from said coupling means in response to indexing of said rotary unit to a predetermined position on completion of exposures with fade-out effect.

16. A combination as defined in claim 1, further comprising locking means for holding said release means in an operative position, said fading means further comprising input means for disengaging said locking means from said release means in response to movement of said actuating means from said operative position.

17. A combination as defined in claim 16, wherein said release means has a slot and said locking means is arranged to enter said slot in the operative position of said release means and in response to movement of said actuating means to said operative position.

18. A combination as defined in claim 1, wherein said fading means further comprises input means movable by said actuating means to operate said coupling means so that the latter connects said rotary unit with said prime mover in response to movement of said actuating means to said operative position, and holding means for preventing disengagement of said rotary device from said prime mover while the camera makes exposures with fade-in effect and while said actuating means is out of said operative position.

19. A combination as defined in claim 18, wherein said holding means comprises a first holding member on said input means and a second holding member engaging said first holding member in response to movement of said actuating means to said operative position, said rotary unit having means for disengaging said second holding member from said first holding member in response to such displacement of said rotary unit which the latter performs during the making of exposures with fade-in effect.

20. A combination as defined in claim 1, further comprising controlling means for maintaining said diaphragm means in that position in which the size of said aperture is zero during rearward transport of said length of film.

21. A combination as defined in claim 20, wherein said controlling means comprises a member which receives motion from said rotary unit and maintains said diaphragm means in closed position while said rotary unit is being indexed through said second distance.

22. In a motion picture camera, a combination comprising a film transporting mechanism including a prime mover having a reversible electric motor, a rotary driving member which is driven by said motor, and means for rotating the takeup reel of a film containing magazine at least while said driving member is rotated in a first direction corresponding to the operation of said motor during forward transport of motion picture film; release means operable to start said motor and including a normally open first switch in the circuit of said motor, said motor circuit further including a normally open second switch connected in parallel with said first switch; adjustable diaphragm means defining a light-admitting aperture of variable size; and fading means including actuating means movable to and from an operative position in which said actuating means sets the fading means for operation with fade-out effect in response to starting of said motor in a forward direction, an indexible rotary programming unit, coupling means for connecting said rotary unit to said prime mover in response to movement of said actuating means to said operative position, said coupling means comprising a power train connectable with said driving member in response to movement of said actuating means to said operative position to thereby index said rotary unit when said driving member rotates, adjusting means cooperating with said rotary unit to adjust said diaphragm means so that the aperture size gradually decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, arresting means for automatically stopping said motor in response to indexing of said rotary unit through such second distance which said rotary unit covers while said film transporting mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes with fade-in effect that length of film which was previously exposed with fade-out effect and closing means for closing said second switch during indexing of said rotary unit through said first and second distances so that said circuit remains completed irrespective of the position of said first switch.

23. A combination as defined in claim 22, wherein said rotary unit comprises a disk-shaped element which cooperates with said closing means to maintain said second switch in closed position.

24. In a motion picture camera for use with motion picture film which is stored in magazines having a takeup reel rotatable in a single direction to collect the film thereon, a combination comprising a film transporting mechanism including a prime mover having a reversible electric motor, a rotary driving member which is driven by said motor, and means for rotating the takeup reel of a film containing magazine while said driving member is rotated in a first direction corresponding to the operation of said motor during forward transport of motion picture film, said means for rotating comprising a rotary output member which is coupled to the takeup reel of a magazine when the latter is properly inserted into the camera; release means operable to start said motor; adjustable diaphragm means defining a light-admitting aperture of variable size; and fading means including actuating means movable to and from an operative position in which said actuating means sets the fading means for operation with fade-out effect in response to starting of said motor in a forward direction, an indexible rotary programming unit, coupling means for connecting said rotary unit to said prime mover in response to movement of said actuating means to said operative position, said coupling means comprising a power train connectable with said driving member in response to movement of said actuating means to said operative position to thereby index said rotary unit when said driving member rotates, adjusting means cooperating with said rotary unit to adjust said diaphragm means so that the aperture size gradually decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, arresting means for automatically stopping said motor in response to indexing of said rotary unit through such second distance which said rotary unit covers while said film transporting mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes with fade-in effect that length of film which was previously exposed with fade-out effect, and blocking means for holding said output member against rotation in response to movement of said actuating means to said operative position so that the takeup reel cannot be rotated by said motor during the making of exposures with fade-out effect.

25. A combination as defined in claim 24, wherein said blocking means comprises a pawl and said output member has ratchet teeth which are engaged by said pawl in response to movement of said actuating means to said operative position.

26. A combination as defined in claim 25, wherein said fading means further comprises input means receiving motion from said actuating means and arranged to move said pawl into engagement with said teeth in response to movement of said actuating means to said operative position.

27. A combination as defined in claim 24, for use with motion picture film which is stored in magazines of a second type having a takeup reel rotatable in two directions and insertable into the camera upon removal of a magazine of the first type, said fading means further comprising means for disengaging said blocking means from said output member to permit rotation of the takeup reel in a magazine of the second type during the making of exposures with fade-out effect and during rearward transport of the film subsequent to fade-out.

28. A combination as defined in claim 27, wherein said means for disengaging said blocking means from said output member comprises detector means arranged to scan coding means provided on magazines of the second type.

29. In a motion picture camera a combination comprising a film transporting mechanism including a prime mover having a reversible electric motor, a rotary worm which is driven by said motor, and means for rotating the takeup reel of a film-containing magazine at least while said worm in rotated in a first direction corresponding to the operation of said motor during forward transport of motion picture film; release means operable to start said motor; adjustable diaphragm means defining a light-admitting aperture of variable size; and fading means including actuating means movable to and from an operative position in which said actuating means sets the fading means for operation with fade-out effect in response to starting of said motor in a forward direction, an indexible rotary programming unit having a set of ratchet teeth, coupling means for connecting said rotary unit to said prime mover in response to movement of said actuating means to said operative position, said coupling means comprising a power train connectable with said worm in response to movement of said actuating means to said operative position to thereby index said rotary unit when said driving member rotates, said power train comprising a gear, means for moving said gear into mesh with said worm in response to movement of said actuating means to said operative position, and means for indexing said rotary unit in response to rotation of said gear including a pawl receiving motion from said gear and arranged to index said rotary unit stepwise through the intermediary of said ratchet teeth, said fading means further including adjusting means cooperating with said rotary unit to adjust said diaphragm means so that the aperture size gradually decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, and arresting means for automatically stopping said motor in response to indexing of said rotary unit through such second distance which said rotary unit covers while said film transport mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes with fade-in effect that length of film which was previously exposed with fade-out effect.

30. In a motion picture camera, a combination comprising a film transporting mechanism including a prime mover having a reversible electric motor, a rotary driving member which is driven by said motor, and means for rotating the takeup reel of a film containing magazine at least while said driving member is rotated in a first direction corresponding to the operation of said motor during forward transport of motion picture film; means for changing the speed of said motor; release means operable to start said motor; adjustable diaphragm means defining a light-admitting aperture of variable size; fading means including actuating means movable to and from an operative position in which said actuating means sets the fading means for operation with fade-out effect in response to starting of said motor in a forward direction, an indexible rotary programming unit, coupling means for connecting said rotary unit to said prime mover in response to movement of said actuating means to said operative position, said coupling means comprising a power train connectable with said driving member in response to movement of said actuating means to said operative position to thereby index said rotaty unit when said driving member rotates, adjusting means cooperating with said rotary unit to adjust said diaphragm means so that the aperture size graudally decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, and arresting means for automatically stopping said motor in response to indexing of said rotary unit through such second distance which said rotary unit covers while said film transporting mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes with fade-in effect that length of film which was previously exposed with fade-out effect; and regulating means for determining the speed of said motor in response to movement of said actuating means to said operative position.

31. In a motion picture camera for alternating use with film which is stored in magazines of a first type having a takeup reel rotatable in a single direction to collect the film thereon and with film which is stored in magazines of a second type having a takeup reel rotatable in two directions, a film transporting mechanism including a prime mover having a reversible electric motor; release means operable to start said motor; adjustable diaphragm means defining a light-admitting aperture of variable size; and fading means including actuating means movable to and from an operative position in which said actuating means sets the fading means for operation with fade-out effect in response to starting of the motor in a forward direction, an indexible rotary programming unit, coupling means for connecting said rotary unit to said motor in response to movement of said actuating means to said operative position, adjusting means cooperating with said rotary unit to adjust said diaphragm means so that the aperture size gradually decreases to zero and the camera makes exposures with fade-out effect during indexing of said rotary unit through a first distance, reversing means controlled by said rotary unit and operative to change the direction of rotation of said motor in response to completion of indexing of said rotary unit through said first distance whereby said film transporting mechanism moves rearwardly that length of motion picture film which was exposed with fade-out effect, arresting means for automatically stopping said motor in response to indexing of said rotary unit through such second distance which said rotary unit covers while said film transporting mechanism completes the rearward transport of that length of film which was exposed with fade-out effect, said adjusting means being arranged to automatically adjust said diaphragm means in response to renewed operation of said release means subsequent to stoppage of said motor by said arresting means and subsequent to movement of said actuating means from said operative position whereby the camera exposes with fade-in effect that length of film which was previously exposed with fade-out effect, said prime mover further comprising a rotary output member which is coupled to the takeup reel of a magazine of said first type when the latter is properly inserted into the camera and said fading means further comprising blocking means for holding said output member against rotation in response to movement of said actuating means to said operative position so that the takeup reel of a magazine of said first type cannot be rotated by said motor during the making of exposures with fade-out effect, and means for disengaging said blocking means from said output member to permit rotation of the takeup reel in a magazine of said second type during the making of exposures and during rearward transport of film in a magazine of said second type.

* * * * *